(No Model.)

H. C. PENNELL.
FISH HOOK.

No. 356,499.  Patented Jan. 25, 1887.

Witnesses
C. W. Benjamin
Louis W. Frost

H. Cholmondeley Pennell
Inventor

United States Patent Office.

HENRY CHOLMONDELEY PENNELL, OF LONDON, ENGLAND.

FISH-HOOK.

SPECIFICATION forming part of Letters Patent No. 356,499, dated January 25, 1887.

Application filed May 29, 1886. Serial No. 203,639. (No model.)

*To all whom it may concern:*

Be it known that I, HENRY CHOLMONDELEY PENNELL, a subject of the Queen of Great Britain, residing in the city of London, England, have invented a new and useful Improvement in Fish-Hooks, of which the following is a specification, reference being had to the accompanying drawings.

It has been the custom to provide fish-hooks, especially when combined with artificial flies for fishing, with a length of silk-worm gut, or with a loop of the same material, to which the fishing-line or leader (if one be used) is fastened. This arrangement is open to many objections, particularly in the case of artificial flies. If the gut length is long, it must be carried coiled up and must be straightened with care, and by a distinct operation for that purpose, before the fly can be used; or if the gut be made sufficiently short to be carried at full length in a pocket fly-book it brings the loops of the leader and of the gut so close to the fly as to in a measure alarm the fish and to affect the chances of the angler unfavorably if in pursuit of what are usually classed as "game fishes." Again, if a mere loop of gut is employed, as is usual in flies intended for salmon-fishing, this loop is liable to become twisted on itself the first time the fly is wet. Thereafter it is almost impossible to make the fly swim upright, and the fly becomes a source of alarm rather than of attraction to the fish. Again, artificial flies, particularly those designed for salmon-fishing, are quite expensive. The useful life of such a fly, if made upon a hook provided with gut, as aforesaid, is limited by the durability of the gut; and the necessity of throwing aside an expensive fly when in perfect condition, solely because the gut to which it is attached has become cracked, broken, frayed, or weak through lapse of time, is of common occurrence.

My invention is intended to meet and overcome all these difficulties.

Figure 1:
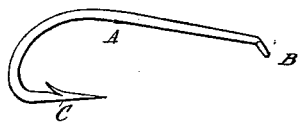
Figure 2:

In the drawings forming part of this specification, Figure 1 represents a side view of my hook, and Fig. 2 said hook when viewed in the direction of its length and with the shank end of the hook toward the spectator.

In said drawings, A represents the shank of said hook, terminating in a small eye, B, which said eye B is bent downward or toward the point side C of the hook. To attain the best result, the angle of the bend with the shank side of the hook should be about forty-five degrees, or half a right angle. The said eye B may be made by thinning the end of the shank A and then bending it to form the said eye, as shown; or it may be made by drilling through the metal, as is customary in making the eyes of sewing-needles, or in any other convenient manner.

I am well aware that fish-hooks provided with both bent and needle eyes are old, and that, except for the coarser kinds of bait-fishing, they have never come into any general use; but the eye in these hooks was defective in that it was formed in a straight line with the shank of the hook. With this construction it was found impossible so to fasten the gut or fishing-line to the hook, that the said gut or line led in a straight line coinciding with the line of the shank of the hook. The consequence was, that the hook stood off at an angle with the gut or line, and that the bait or artificial fly would not swim upright and in a natural position when drawn through the water. This was detrimental to success in fishing when any form of bait was used, and absolutely fatal when a minnow or artificial fly was employed for that purpose. By giving the eye of the hook a bend downward or toward the point side of the hook, as described and shown, this difficulty is overcome. The knot by which the gut or line is secured to the hook falls within the eye and the gut or line draws in a straight line with the under side of the shank of the hook. The bait or fly will then swim upright and in natural position, while the "draft-line," or line of penetration of the hook, is improved, since the direction of the point of the hook more nearly coincides with the direction of the force applied to embed the hook in the fish's mouth. Again, any injury to or weakness in the gut or line near the hook can at once be remedied by cutting out the weak spot and reknotting the gut or line. Thus the useful life of an artificial fly is no longer limited by the durability of the gut to which it is attached; but it may be used until the material of which it is composed is actually disintegrated by contact with the fish's teeth. Thus a fly will last at least three or four times longer than when made in the usual manner with a gut appendage. Furthermore, there are no loops or knots to disturb the water in the vicinity of the bait or fly, and the connection between the lure and the line is much more perfectly disguised—a point of great importance where the fish are timid.

Having thus described my invention, what I claim as new and desire to patent is—

As a new article of manufacture, a fish-hook provided with an eye, which said eye is bent downward or toward the point side of the hook, substantially as shown and described.

In testimony that I claim the foregoing improvement in fish-hooks, as above described, I have hereunto set my hand this 23d day of January, 1886.

HENRY CHOLMONDELEY PENNELL.

Witnesses:
ALBERT N. HATHEWAY,
A. R. HATHEWAY.